United States Patent [19]

Pivetta

[11] Patent Number: 4,793,024
[45] Date of Patent: Dec. 27, 1988

[54] ADJUSTABLE SPRING-LOADED HINGE DEVICE, PARTICULARLY FOR SPECTACLE FRAMES

[75] Inventor: Innocente Pivetta, San Vito Di Valdobbiadene, Italy

[73] Assignee: Celes Optical S.p.A., Pederobba, Italy

[21] Appl. No.: 21,049

[22] Filed: Mar. 2, 1987

[30] Foreign Application Priority Data

Mar. 3, 1986 [IT] Italy .................. 30647B/86[U]

[51] Int. Cl.[4] ............................................. G02C 5/22
[52] U.S. Cl. ......................................... 16/228; 16/291; 16/296; 16/298
[58] Field of Search .................. 16/228, 291, 293, 296, 16/298, 299; 351/113, 153; 267/234, 235, 242

[56] References Cited

U.S. PATENT DOCUMENTS

| | | | |
|---|---|---|---|
| 1,599,843 | 9/1926 | Schumacher | 351/113 X |
| 3,990,521 | 11/1976 | Ankenman et al. | 267/242 X |
| 4,618,226 | 10/1986 | Sarter et al. | 351/113 |

FOREIGN PATENT DOCUMENTS

| | | | |
|---|---|---|---|
| 96928 | 12/1983 | European Pat. Off. | 16/228 |
| 612322 | 11/1960 | Italy | 351/113 |

Primary Examiner—Fred A. Silverberg
Attorney, Agent, or Firm—Albert Josif; Guido Modiano

[57] ABSTRACT

The hinge device comprises a recess formed in the rod or stem of a pair of spectacles and accommodating a leafspring. The spring has a conformation such that it pivots on the inner surface of the recess and cooperates with an element, rigidly associated with the front of the spectacles and pivotally connected to the rod. An adjustment screw is provided which extends into the recess and which interferes with the spring to vary the biasing action exerted on the element, when rotating the rod relatively thereto.

7 Claims, 2 Drawing Sheets

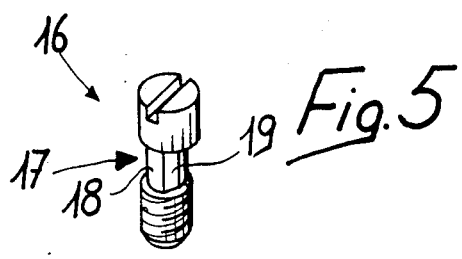
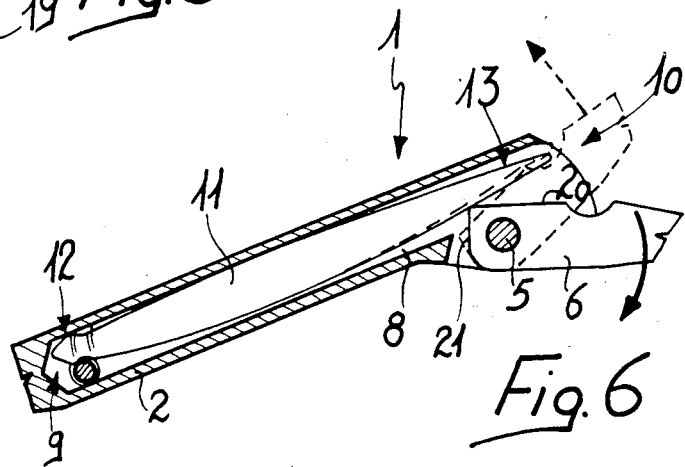
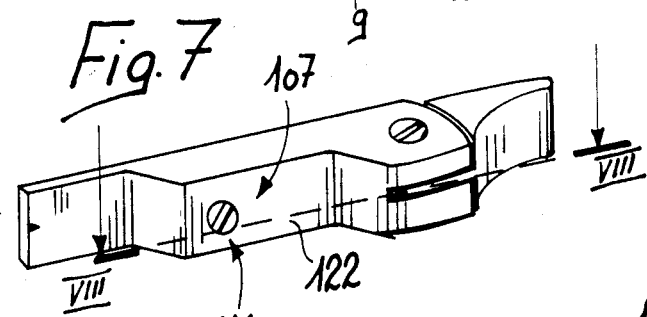
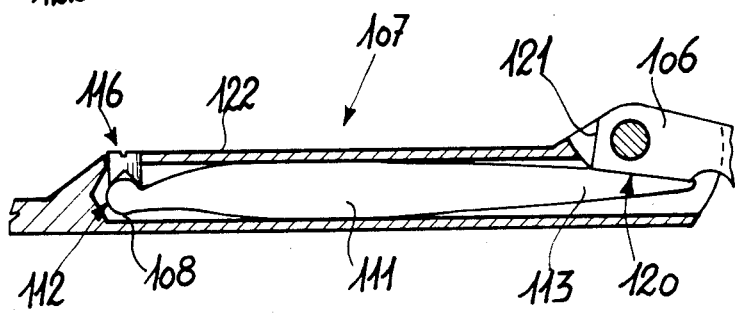
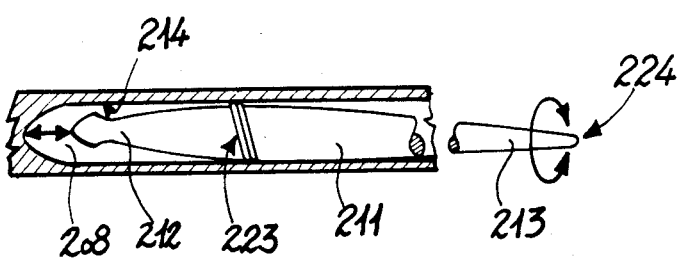

4,793,024

ADJUSTABLE SPRING-LOADED HINGE DEVICE, PARTICULARLY FOR SPECTACLE FRAMES

BACKGROUND OF THE INVENTION

The present invention relates to an adjustable spring-loaded hinge device, particularly for spectacle frames.

A number of elastic hinges of known kinds are provided so as to allow an additional opening of the stem or rod wherewith they are associated to beyond the condition of normal opening which is the one which can be obtained by defining an angle of approximately 90° between said rod and the front part of the spectacle frames.

This condition tends to allow the user the possibility of wearing the spectacles so as not to lose them, due to sudden movements, since the rods or stems are pressed against the wearers temples.

However, this condition has been found to give rise to displeasing collateral effects, such as skin irritation and/or headaches.

SUMMARY OF THE INVENTION

Accordingly, the main aim of the present invention is to eliminate the above described disadvantages by providing an adjustable spring-loaded hinge device which allows an optimum use of the spectacles with which they are associated, according to the individual requirements of the user.

Within the above-cited aim, an important object of the invention is to provide an adjustable spring-loaded hinge device which associates with the above characteristic those of allowing additional elastic opening of the hinge device in use, providing a snap-closure of the rods or stems of the spectacles, and which, at the same time, is structurally simple and easy to manufacture.

Another important object of the invention is to provide an adjustable spring-loaded hinge device which associates with the above characteristics, those of having small dimensions and excellent aesthetic characteristics.

The cited aim and objects, as well as other objects which will become apparent hereinafter, are achieved by an adjustable spring-loaded hinge device, characterized in that it comprises a rod, pivotally connected to an element, adapted to be rigidly associated with the front part of the frame of a pair of spectacles and is provided with housing means, adapted for accommodating an elastic biasing means having at least one end which cooperates with said element, and which is adapted for defining positions of stable balance and additional opening with elastic return, said device further comprising adjustment means, adapted for adjusting the position of at least one of the ends of said elastic biasing means, said elastic biasing means being adapted for pivoting, at an intermediate region thereof, on said housing means.

BRIEF DESCRIPTION OF THE DRAWINGS

Further characteristics and advantages of the invention will become apparent from the detailed description of a particular embodiment, illustrated only by way of non-limitative example in the accompanying drawings, wherein:

FIG. 5 is a view of the adjustment means employed;

FIG. 6 is a view, similar to the one of FIG. 2, of the operation of the hinge;

FIG. 7 is a perspective view of an adjustable spring-loaded hinge device according to another aspect of the invention;

FIG. 8 is a view along the cross section plane VIII—VIII of FIG. 7; and

FIG. 9 is a cross-sectional view of an adjustable spring-loaded hinge device according to a further aspect of the invention.

DESCRIPTION OF THE PREFERRED EMBODIMENTS

Figure 1:
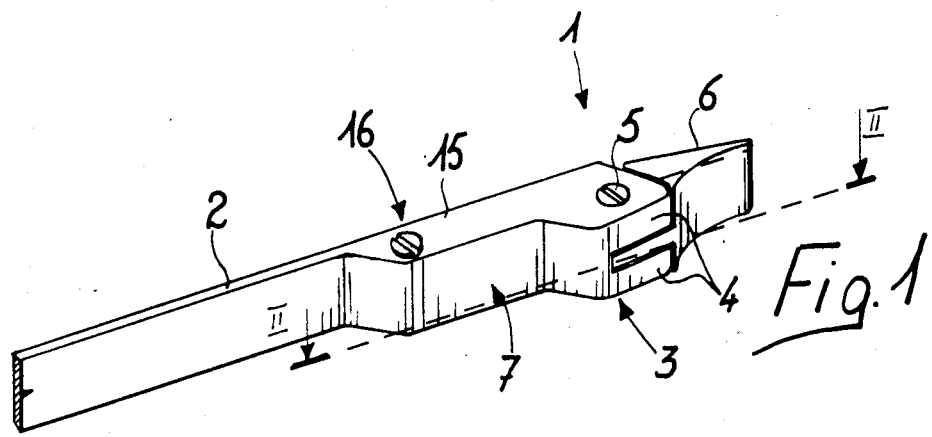
FIG. 1 is a perspective view of the adjustable spring-loaded hinge device according to the invention.

With reference to the above described figures, the adjustable spring-loaded hinge device 1 comprises a rod or stem 2 which is provided, at one end, with a head 3, advantageously composed of two parallel plane faces 4, between which is pivoted, by means of the use of a screw 5, an element 6, advantageously of the type which is usually welded on a bracket, in turn rigidly coupled to a spectacle frame.

Proximate to the head 3, the rod 2 has a region 7 of slightly greater thickness so as to allow the provision of a housing means such as a cylindrical longitudinal recess 8, provided with one blind end 9, and another end expediently provided with an opening 10, at the terminal end of the head 3.

Inside the recess 8, an elastic biasing means such as an elastically deformable element or leaf spring 11 is arranged, which spring advantageously has a substantially circular cross section and defines a substantially frusto-conical shape at each of its ends 12 and 13, said spring having a longitudinal extension approximately corresponding to the longitudinal extension of the recess 8.

Said spring expediently has a conformation including tapered zones such that it pivots on the inner surface 14 of the recess 8 and thus defines a pivoting point or hinge zone, said pivoting point being advantageously located closer to the end 12 of the spring 11 placed proximate to the end 9 of the recess 8, than the end 13 of the spring 11 facing the opening 10.

On the surface 15 of the region 7, a seat, advantageously a partially threaded through seat is provided for at least partially accommodating an adjustment means composed, for example, of a screw 16, the latter being provided with an intermediate region 17 of the stem with a reduced diameter; on the lateral surface 18 of the region 17, a plane region 19 may be provided longitudinally by milling.

The axis of said screw 16 is substantially perpendicular to the plane of the surface 15, and is offset with respect to the diametral axis of the recess 8, extending substantially parallel thereto.

Said screw is advantageously positioned proximate to the blind end 9 of the recess 8, so as to define an interspace between the inner surface 14 of the recess 8 and the lateral surface 18 of the intermediate region 17 of the screw 16, so as to allow the selective positioning of the end 12 of the spring 11, the latter being partly shaped to match the intermediate region 17 of the screw 16, so that any longitudinal motion thereof is prevented.

The opposite end 13 of the spring 11 cooperates instead with the surfaces 20 and 21 of the element 6, extending essentially perpendicular to each other and having exerted thereon, the elastic thrust or spring-loading action generated by the spring 11. The operation of the hinge device is thus as follows: first the head 3 of the rod 2 may be already associated with the element 6 and the rod 2 may have been subjected to any eventual galvanic or the like surface treatments, then it will be possible to insert the leaf spring 11 into the seat 8 through the opening 10, this operation being simply and rapidly effected.

The subsequent phase entails the insertion of the adjustment means which in this illustrated example comprise a screw 16, which will cooperate with the neck-like portion defined proximate to the frusto-conical end 12 of the spring 11, thereby selectively blocking any undesired longitudinal motion of the spring with respect to the recess 8, and preventing the spring from moving out of the recess 8 through the opening 10.

The use of the adjustment means 16 advantageously allows selective pre-loading of the spring 11: indeed, if the lateral surface 18 of the screw 16 is placed in contact with the spring 11, maximum pre-loading of the spring will be obtained by preventing any movement of the spring 11 with respect to the recess 8; if instead the plane region 19 is placed in contact with the spring 11 by rotating the screw 16, the degree of spring pre-loading will be smaller since said spring 11 will be able to perform a small longitudinal motion with respect to the recess 8 and thus slightly vary the pivoting point of the spring 11 on the inner surface of the recess 8.

The arrangement of the surfaces 20 and 21 defined at the end of the rod 2 which cooperate with the end 13 of the spring 11, allows the determination of two stable positions of the rod 2 with respect to the front of a pair of spectacles, one of which positions defines additional opening i.e., positioning of the rod 2 at an angle of more than 90° with respect to the front of a pair of spectacles, with elastic return to a normal position whereat said rod is located substantially perpendicularly with respect to said front.

Figure 2:
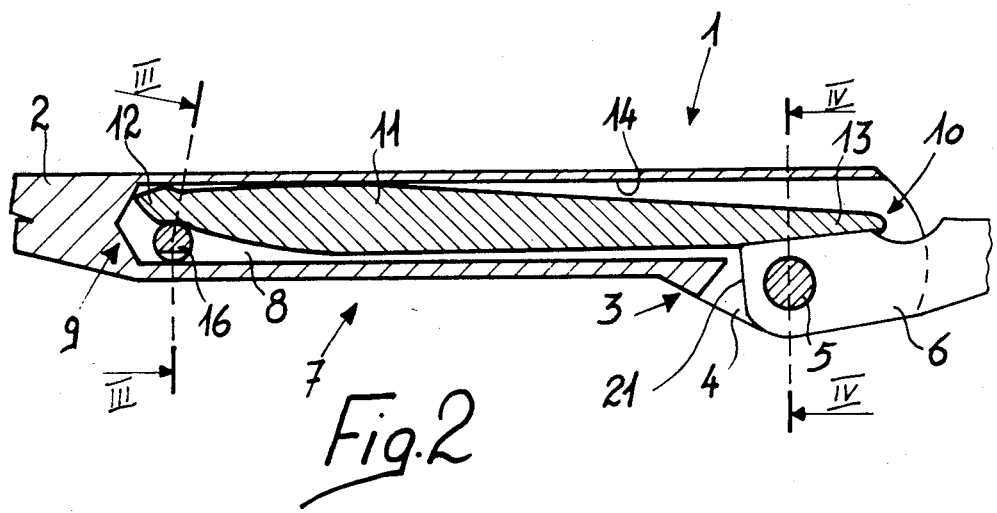
FIG. 2 is a view taken along the cross section plane II—II of FIG. 1.
Figure 3:
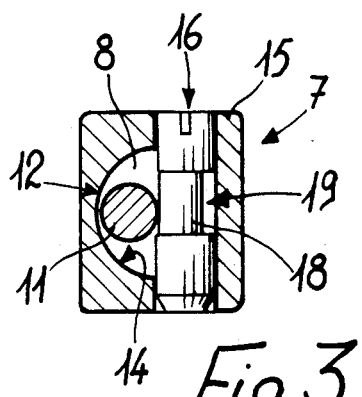
FIG. 3 is a view taken along the cross section plane III—III of FIG. 2.
Figure 4:
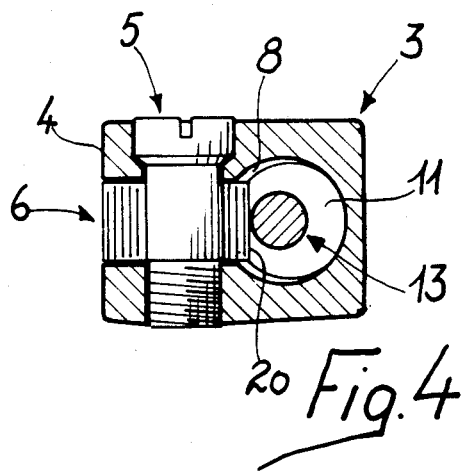
FIG. 4 is a view taken along the cross section plane IV—IV of FIG. 2.

A first condition of stability is illustrated in FIG. 2 and corresponds to an opening position which is normal with respect to the frame.

In FIG. 6, the broken lines illustrate the additional opening condition with elastic return, while the solid lines illustrate the phase which is intermediate to the second position of stability, corresponding to the closing of the rod on the frame, which can be obtained by placing the surface 21 of the element 6 in contact with the end 13 of the spring 11.

It has thus been observed that the invention has achieved the proposed aim and the objects, since the user can first and foremost obtain the optimum degree of pre-loading according to his requirements and personal comfort by simply acting with a screwdriver on the screw 16.

Furthermore, the adjustable spring-loaded hinge device is structurally very simple, its assembly does not require any skilled labour, and it can be assembled very rapidly.

FIG. 7 illustrates another aspect of the invention, wherein an internally threaded hole is provided on the plane surface 122 of the region 107 facing the wearers temple, which hole communicates with the inner longitudinal recess 108, and defines a seat for at least partially accommodating a matchingly threaded screw which constitutes the adjustment means 116, said screw being provided with a terminal end in the shape of a hollow wedge with the pointed portion of the wedge facing the head of the screw.

This hollow wedge-like end cooperates with the end 112 of the leaf spring 111, said end 112 being essentially spherical in shape and having such dimensions as to be engaged by the adjustment means 116.

Also in this case, the elastically deformable element or spring 111 is shaped so that it pivots on the inner surface of the recess 108, the end 113 cooperating instead with the surfaces 120 and 121 of the element 106.

Also in this case, there is a selective adjustment of the pre-loading of the spring 111, it being possible for said adjustment to be gradual by screwing or unscrewing the adjustment means 116.

FIG. 9 illustrates a further aspect of the invention, wherein the leaf spring 211 is provided, approximately at the pivoting point, with one or more threads or adjuster threads 223 which cooperate with matchingly shaped seats or adjuster seats provided on the lateral surface 214 of the longitudinal recess 208.

The recess 208 has a longitudinal extension which is slightly greater than the longitudinal extension of the spring 211, so as to allow the terminal end 212 of the spring to perform a longitudinal motion within the recess, once the operator has caused said spring to rotate.

This rotation can be provided by taking hold of the end 213 or by acting with a specific tool on a suitable seat or actuation seat 224 provided thereon.

Also in this case, an adjustment is provided which allows one to selectively vary the efforts required to achieve the additional opening or the snap-closure motion of the rod or stem 2 with respect to the front of a pair of spectacles.

Naturally, the materials and the dimensions of the various components of the adjustable spring-loaded hinge device may be any according to the requirements.

I claim:

1. An adjustable spring-loaded hinge device, particularly for spectacle frames, comprising
    at least one element adapted to be rigidly associated with a spectacle frame front portion,
    a rod pivotally connected to said element and having a head,
    a cylindrical longitudinal recess defined in said head of said rod and having at least one blind end and at least one opening,
    elastic biasing means comprising a spring, said spring having a substantially circular cross-section and truncated-cone shaped ends, said spring being accommodated in said recess and having an intermediate portion, said ends including at least one end and at least one other end, said one end being adapted for cooperation with said element for determining conditions of stable balance and additional opening with elastic return, said other end facing said blind end of said recess, said spring defining a position in said recess,
    a pivot point defined by said intermediate portion and being adapted for pivoting on said recess,
    an inner lateral surface defined on said recess,
    seats defined on said inner lateral surface,
    at least one thread formed on said spring substantially at said pivot point and being adapted for cooperation with said seats,
    adjustment means adapted for permitting gradual rotation of said one end of said spring for adjusting said position of said spring in said recess.

2. An adjustable spring-loaded hinge device, particularly for spectacle frames, comprising
   at least one element adapted to be rigidly associated with a spectacle frame front portion,
   a rod pivotally connected to said element and having a head,
   a recess defined in said head of said rod and having an inner surface,
   elastic biasing means accommodated in said recess and having ends and an intermediate portion, said ends including at least one end and at least one end, said one end being adapted exerting an elastic thrust on said element for determining conditions of stable balance and additional opening with elastic return,
   a pivot point defined by said intermediate portion and being adapted for pivoting on said inner surface of said recess,
   rotary adjustment means cooperating with said elastic biasing means and being rotatable between a maximum preloading position whereat said other end of said elastic biasing means abuts against said inner surface of said recess and said one end of said elastic biasing means exerts a maximum elastic thrust on said element, and a minimum pre-loading position whereat said other end of said elastic biasing means is spaced from said inner surface of said recess and said one end of said elastic biasing means exerts a minimum elastic thrust on said element.

3. An adjustable spring-loaded device according to claim 2, wherein said rotary adjustment means comprise
   at least one threaded through seat formed in said rod and communicating with said recess,
   at least one screw, partially rotatably accommodated in said seat,
   at least one neck-like portion defined on said elastic biasing means proximate to said other end, and
   at least one engagement zone defined on said screw and adapted for selectively engaging said neck-like portion of said elastic biasing means,
wherein rotation of said screw to said maximum pre-loading position causes said engagement zone to engage with said neck-like portion which in turn causes said other end of said elastic biasing means to abut against said inner surface of said recess, and wherein rotation of said screw to said minimum pre-loading position cuases disengagement of said engagement zone from said neck-like zone such that said other end of said elastic biasing means is spaced from said inner surface of said recess.

4. An adjustable spring-loaded hinge device according to claim 3, wherein said screw has a stem, said stem defining an intermediate region, said intermediate region having a lateral surface, and wherein said engagement zone of said screw comprises at least one plane region formed on said lateral surface.

5. An adjustable spring-loaded hinge device according to claim 3, wherein said other end of said elastic biasing means has a substantially spherical conformation, and wherein said screw has a terminal end, said terminal end of said screw having a hollow wedge-like shape, said hollow wedge-like shape of said terminal end being adapted for selectively engaging said substantially spherical conformation of said other end of said elastic biasing means.

6. An adjustable spring-loaded hinge device according to claim 2, wherein said inner surface of said recess has a lateral recess surface and at least one blind end, and wherein said rotary adjustment means cooperating with said elastic biasing means comprise adjuster threads and adjuster seats, said adjuster threads being formed on said elastic biasing means, said adjuster seats being formed on said lateral recess surface, said adjuster threads being rotatable in said adjuster seats for causing axial displacement of said elastic biasing means within said recess between said maximum pre-loading position whereat said other end of said elastic biasing means abuts against said blind end of said recess, and said minimum pre-loading position whereat said other end of said elastic biasing means is spaced from said blind end of said recess.

7. An adjustable spring-loaded hinge device according to claim 6, wherein said one end of said elastic biasing means has formed thereon at least one actuation seat, said actuation seat being adapted to be engaged by a tool for causing rotation of said adjuster threads in said adjuster seats.

* * * * *